UNITED STATES PATENT OFFICE 2,607,675

DISTILLATION OF METALS

Philipp Gross, Slough, England, assignor to International Alloys Limited, Aylesburg, England No Drawing. Application August 16, 1949, Serial No. 110,681. In Great Britain September 6, 1948

7 Claims. (Cl. 75—84)

It is well known in the art that metals such as alkali metals, arsenic, barium, cadmium, calcium, magnesium, mercury, strontium, thallium, and zinc, which have an appreciable vapour pressure at technically practicable temperatures, can be refined and/or produced by direct distillation, i. e. by transferring the metal into the vapour phase by heating material containing the metal to elevated temperatures under normal pressure or, in order to reduce the distillation temperature, under reduced pressure. These metals can be distilled at comparatively low temperatures because their heat of evaporation, i. e. the heat necessary to transfer them into the vapour phase, is relatively low.

The present invention provides a distillation process for producing or refining metals which have not a sufficiently high vapour pressure for direct distillation at technically practicable temperatures. The heat of evaporation of these metals is relatively high and the reaction for their direct transfer into the vapour phase is therefore strongly endothermic. In this connection, the expression "metal" is to be understood as also including transition elements between metals and metalloids. Accordingly the expression "normally non-volatile metal" hereinafter refers to these metals and transition elements.

The distillation process of the invention can be applied to impure normally non-volatile metals, to their alloys, to their compounds with elements which are not, or little, volatile under the conditions of reaction, such as their carbides or intermetallic compounds with one or more normally non-volatile metals, or to compounds with elements which are volatile at the temperature of the distillation reaction but dissociate in a practically irreversible manner at that temperature, such as many nitrogen metal compounds, and, in the presence of a suitable reducing agent such as carbon, to their oxides or compounds derived from those oxides. The term "distil" (distillation) as used in this connection thus comprises purifying (purification) and producing (production) by distillation non-volatile metals from materials bearing the same. The term "metal bearing materials" thus includes the impure metals as well as any of the previously mentioned substances or mixtures of substances or any substances containing the same.

The invention is based on the conception that the heat of the transference reaction of a normally non-volatile metal into the vapour phase is less than that of the direct transference reaction (evaporation) if the transfer is effected by a reaction which is thermo-chemically the sum of the direct transference reaction (evaporation) and another reversible but exothermic reaction so that the total (resulting) transference reaction, while still endothermic, is less endothermic than direct evaporation. Such an exothermic reaction, according to the invention, is the reaction of the vapour of the normally non-volatile metal with the vapour of the halide of a volatile metal in which vapours of the volatile metal and of the halide of the normally non-volatile metal are formed. Although the resulting reaction is thermo-chemically the sum of the endothermic formation of the vapour of the normally non-volatile metal and of its exothermic reaction with the vapour of the halide of the volatile metal, only the resulting reaction is actually carried out when practising the invention by reacting in one single step the normally non-volatile metal contained in a condensed (i. e. solid or liquid) phase with the vapour of the halide of the volatile metal.

When practising the invention a normally non-volatile metal is therefore transferred from a material bearing the same into the vapour phase as its stable halide at a temperature which, under the prevailing pressure, is lower than the temperature of direct evaporation of the normally non-volatile metal from the said material, and appropriate to approach or establish the (pressure dependent) equilibrium between the solid or liquid metal bearing material and the vapour of the halide of a volatile metal, whereby the vapour of the volatile metal and the halide of the normally non-volatile metal are formed within the resulting vapour mixture, and the normally non-volatile metal is recovered from the vapour mixture by cooling this mixture whereby the volatile metal vapour reacts with the vapour of the stable halide of the non-volatile metal with formation of the non-volatile metal which condenses and of the halide of the volatile metal.

Due to the fact that the reaction is endothermic the metal is recovered from the resulting vapours, by converting them by cooling into the non-volatile metal and the original halide. If, however, the metal bearing material gives rise to the formation of potentially oxidizing vapours or gases, such as carbon monoxide in the case of a mixture of carbon and metal oxide being the metal bearing material, special precautions may have to be adopted, which are well known in the art from the carbonthermic reduction of magnesia and consists in shock cooling (chilling) of the reaction vapours.

Under a modification of the invention the halide of the volatile metal is replaced by the halide of a metalloid, for instance phosphorus, which metalloid is volatile under the conditions of the reaction, whereby the resulting vapour mixture contains the vapour of this metalloid together with the vapours of the halides of the normally non-volatile metal and the metalloid.

Under another modification of the invention use can be made of the higher halide of metals or metalloids which need not be volatile by themselves but are transferred into the vapour phase as stable or unstable lower halides. By their reaction with the metal bearing material, the transfer of the normally non-volatile metal to be distilled into the vapour phase at elevated temperature is effected by the endothermic reaction of the normally non-volatile metal to be distilled with the vapour of the higher halide of the other non-volatile metal, whereby the vapour of the lower halide of the metal (or metalloid) contained in the original halide and the normal halide of the normally non-volatile metal to be distilled are formed. By the expression "higher" or "lower" halide of a metal or metalloid, a halide of this element in which it has a higher or lower valency respectively is to be understood. The normally non-volatile metal to be distilled is recovered from the resulting vapours essentially by the reversal of this reaction by cooling them.

Halides (singly or mixed) suitable for the indirect distillation of metals according to the invention are hereinafter referred to as halides of volatile substances.

The invention provides a process for the distillation of a normally non-volatile metal from materials bearing the same which comprises selecting the halide of a volatile substance the vapour of which has an average heat of dissociation into substance vapour and halogen atoms smaller than the average heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said halide, contacting and reacting the vapour of the said halide with the said material at an elevated temperature, this temperature, under the prevailing pressure, being above the temperature of evaporation of the said volatile substance in contact with the said metal bearing material and below the temperature of formation of the unstable lower halide of the said non-volatile metal from the said metal bearing material, thereby reacting the non-volatile metal with the vapour of the halide of the volatile substance to vapourize the stable halide of the non-volatile metal from said material with simultaneous formation of the vapour of the volatile substance, and cooling the vapour mixture from that reaction to convert it into the non-volatile metal and the halide of the volatile substance and condense the non-volatile metal.

The method is suitable to separate normally non-volatile metals such as, for instance, beryllium or vanadium for non-metallic impurities such as oxides or carbides which adhere to them in the more common processes of production, or to obtain in a relatively pure state normally non-volatile metals which are more easily and cheaply produced in the form of their alloys or inter-metallic compounds usually containing also carbon by reduction of their ores, especially in a blast furnace or arc furnace, such as ferro-manganese, ferro-vanadium, ferro-titanium, and ferro-chromium, and also ferro-molybdenum, and ferro-tungsten. Generally speaking, of the metals contained in such an alloy or inter-metallic compound that metal which has the greater affinity to halogen will reaction with the vapour of the halide of the volatile metal more easily (i. e. at lower temperatures and higher pressures respectively) than the other metallic constituent or constituents of the alloy, and by carrying out the process of the invention under appropriate conditions (of temperature and pressure) the constituents will be separated from each other.

The method is carried out, for instance, by conducting a vapour of the halide of the volatile substance at elevated temperature and preferably under reduced pressure over the solid or liquid metal bearing material, which is preferably brought to a condition of a high specific surface area, and cooling the resulting vapours in one or more suitable condensers, whereby they react on each other thereby giving the metal and the original halide.

If Me(c) denotes the condensed (i. e. solid or liquid) normally non-volatile metal to be distilled, which is assumed to be of valency $n$, if X denotes a halogen, and if $MaX_m(v)$ denotes the vapour of the halide of the metal or metalloid used for its indirect distillation, the equation for the reaction of indirect distillation of the metal Me is $$mMe(c) + nMaX_m(v) \rightleftharpoons nMeX_n(v) + nMa(v) \quad (I)$$

in which $MeX_n(v)$ and $Ma(v)$ denote the vapours of the halide $MeX_n$ and of the metal or metalloid Ma respectively.

For instance, if beryllium is the normally non-volatile metal to be distilled and if sodium chloride is used for its indirect distillation, the distillation reaction is:

$$Be(c) + 2NaCl(v) \rightleftharpoons BeCl_2(v) + 2Na(v)$$

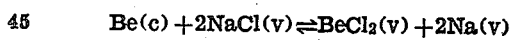

If the metal to be distilled is again of valency $n$ and denoted again by Me(c) and if, under the modification of the invention, use is made of the higher halide $(MbX_f)$ of the metal (Mb) which is volatile as its lower halide $(MbX_g)$ $(g<f)$, the distillation reaction is:

$$(f-g)Me(c) + nMbX_f(v) \rightleftharpoons (f-g)MeX_n(v) + nMbX_g(v) \quad (I')$$

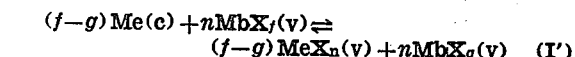

For instance, in the case of the indirect distillation of the metal Me with the aid of aluminium trichloride as (stable) higher and aluminium monochloride as (unstable) lower halide, the reaction is:

$$2Me(c) + nAlCl_3(v) \rightleftharpoons 2MeCl_n(v) + nAlCl(v)$$

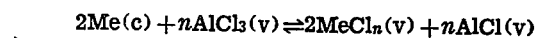

Amongst the halides, fluorides and chlorides are preferred, although bromides, and in some cases iodides, are also effective.

In order that a metal with too low a vapour pressure for direct distillation (normally non-volatile metal) can be distilled, or in order that the distillation temperature of such a metal may be reduced by the indirect distillation method, in accordance with the present invention, the following conditions must be fulfilled:

(1) The halide $YX_m$ of a substance Y, which must be volatile under the conditions of reaction, must be chosen so that the average heat of dissociation into substance vapour (Y) and halogen atoms (X atom) of this halide vapour (YX$_m$ vapour) is (a) Smaller than the average heat of dissociation of the vapour of the halide (MeX$_n$ vapour) of the metal (Me) to be distilled into metal atom (Me atom) and halogen atoms (X atom), and (b) Greater than the average heat of dissociation of the vapour of the same halide (MeX$_n$ vapour) into condensed metal (Me cond.) and halogen atoms (X atom). The average heat of dissociation of the vapour of the halide of a substance YX$_m$ into substance vapour and halogen atom is the heat of dissociation of the halide of the substance into the vapour of the substance and the halogen atoms formed by the dissociation divided by the number of these halogen atoms. The substance itself may be either a volatile element, preferably a metal, or a volatile, stable or unstable, lower halide so that the halide of the substance is the corresponding higher halide. The average heat of dissociation of the metal halide vapour into halogen atoms and metal atom or condensed metal respectively is the total heat of dissociation of the halide into halogen atoms and metal atom or condensed metal respectively, divided by the valency of the metal in the halide.

(2) Under the conditions of reaction the volatile substance originally combined with halogen in the halide must not form with the non-volatile metal, or with any constituent of the material bearing the same, any non-volatile combination (compound, alloy, solution) (or any stable, though volatile, compounds) which would prevent recovery of the metal by reversal of the reaction.

(For instance, if a phosphorus halide is used for the distillation, none of the metals contained in the metal bearing material must form non-volatile phosphides which are stable under the conditions of reaction.)

(3) Under the conditions of the reaction and in contact with the metal bearing material the stable halide of the non-volatile metal must not be converted into an unstable lower halide of the non-volatile metal to any noticeable extent.

The general principle which governs the indirect distillation according to the present invention can easily be understood from the following considerations on direct evaporation and the dissociation of the gaseous halides of the non-volatile metal to be distilled and of a volatile metal or metalloid used for its indirect distillation.

The generalized thermo-chemical reaction for the evaporation of the non-volatile metal can be written:

$$Me(c) \rightleftharpoons Me(v) - Le \quad (II)$$

In this equation Me(v) indicates the metal in its vapour state, which is usually monatomic, and Le is the heat of transfer into the gaseous state for reaction (II), in this case simply the heat of evaporation.

For instance, in the case of beryllium, reaction (II) becomes:

$$Be(c) \rightleftharpoons Be(v) - 80{,}000 \text{ cal.}$$

wherein the value of 80,000 cal. for the heat of evaporation of beryllium has been adapted.

Since the entropy of evaporation does not vary much for the various metals (most metals obeying quite well Trouton's rule, according to which the entropy change at the boiling point is a general constant), the heat of evaporation is the most important individual magnitude regulating the vapour pressure of the metal Me at the absolute temperature T, which vapour pressure is given by $$\log p = -\frac{L'e}{4.574T} + \frac{S'e}{4.574}$$

(wherein L'e and S'e denote the heat, and entropy of evaporation at unit pressure respectively of the metal Me, both corrected to the temperature T).

For instance in the case of beryllium this vapour pressure formula for a temperature of round about 1100° C. becomes:

$$\log p_{Atm} = \frac{-79{,}600}{4.574T} + \frac{29.4}{4.574}$$

The concentration in the gaseous phase of the metal (Me), i. e. its apparent vapor pressure for all distillation purposes, will be raised and distillation facilitated by any means by which the heat of transfer into the gaseous state can be reduced and which has not an equal or greater opposite effect on the entropy of transfer into the gaseous state. If the entropy remains unchanged, any reduction in the heat of transfer will effect an essentially proportional reduction in the practical distillation temperature, measured on the absolute temperature scale.

The thermochemical reaction of the dissociation of the halides of the normally non-volatile metal to be distilled (MeX$_n$) and of the other element which is volatile (MaX$_m$) into gaseous metal (metalloid) and halogen atoms are:

$$MeX_n(v) \rightleftharpoons Me(\text{atom}) + nX(\text{atom}) - nDe \quad (III)$$

and $$MaX_m(v) \rightleftharpoons Ma(\text{atom}) + mX(\text{atom}) - mDa \quad (IV)$$

in which equations, nDe and mDa are the heats of these dissociations into metal atom and halogen atoms.

By combining Equations II, III, IV one obtains $$Me(c) + \frac{n}{m} MaX_m(v) \rightleftharpoons MeX_n(v) +$$
$$\frac{n}{m} Ma(\text{atom}) - [Le - n(De - Da)] \quad (II')$$

This equation represents the thermochemical reaction for the indirect transfer of one gramme atom of non-volatile metal in the vapour phase by combining direct evaporation with the reaction $$Me(v) + \frac{n}{m} MaX_m(v) \rightleftharpoons MeX_n(v)$$
$$+ \frac{n}{m} Ma(\text{atom}) + n(De - Da) \quad (V)$$

Reaction (V) is exothermic in accordance with the invention if, in accordance with the condition 1 (a) above, Da<De. In this case, according to the invention, the reaction of indirect transfer into the vapour state of one gramme atom of non-volatile metal is less endothermic by n(De—Da) than direct evaporation.

For instance, for beryllium chloride vapour, reaction (III) becomes $$BeCl_2(v) \rightleftharpoons Be(\text{atom}) + 2Cl(\text{atom}) - 2 \times 110{,}000 \text{ cal.}$$

with De=110,000 cal., which value has been obtained from the heat of evaporation of beryllium given above, from the heat of formation of solid beryllium chloride (reported to be 112,600 cal.), from the heat of evaporation of beryllium chloride (reported to be 29,600 cal.), and from the heat of dissociation of chlorine (reported to be 56,900 cal.).

For sodium chloride, reaction (IV) becomes $$NaCl(v) \rightleftarrows Na(atom) + Cl(atom) - 96{,}000 \text{ cal.}$$

whereby the heat of formation of solid sodium chloride (98,300 cal.), the heat of sublimation of sodium chloride (57,100 cal.), the heat of evaporation of sodium (25,900 cal.), and the above mentioned heat of dissociation of chlorine have been taken from the literature.

The exothermic reaction which is superimposed on direct distillation if beryllium is volatilized as beryllium chloride in a stream of sodium chloride therefore becomes $$Be(v) + 2NaCl(v) \rightleftarrows BeCl_2(v) + \\ 2Na(v) + 2\times(110{,}000-96{,}000)$$

thus making the indirect distillation $$Be(c) + 2NaCl(v) \rightleftarrows BeCl_2(v) + \\ 2Na(v) - 80{,}000 + 28{,}000$$

less endothermic by about 28,000 cal. than direct evaporation.

The reaction of indirect distillation, according to the invention, will be reversed on cooling, thus leading to the recovery of the non-volatile metal to be distilled and the original halide, only if it is endothermic. As the heat of the reaction of indirect distillation $$mMe(c) + nMa\bar{X}_m(v) \rightleftarrows nMa(v) + \\ mMeX_n(v) - m[Le - n(De - Da)] \quad (I'')$$

is given by $$m[Le - n(De - Da)]$$

the reaction will be endothermic if $$[Le - n(De - Da)] > 0$$

or if $$\left(De - \frac{Le}{n}\right) < Da$$

Since $$\left(De - \frac{Le}{n}\right)$$

constitutes the average heat of dissociation of the vapour of the halide of the non-volatile metal into halogen atoms and condensed metal, the last condition is identical with the aforementioned condition 1 (b).

When the metal bearing material cannot substantially be identified with the non-volatile metal itself, the heat of transfer into the vapour state of the metal has to be corrected for the heat of formation of the condensed metal from the metal bearing material. If the metal bearing material is the impure metal it can substantially be identified with the non-volatile metal. However, if the metal bearing material is, for instance, an intermetallic compound of the metal with some other metal, the heat of formation of the intermetallic compound for one gramme atom of non-volatile metal has to be added to the heat of transfer of one gramme atom of the metal itself into the vapour state. In order to assure condensation of the metal on cooling, condition 1 (b) (concerning the pure condensed metal) has still to be fulfilled.

Quite analogous considerations can be applied to the higher halide (MbX$_f$) of an element (Mb) when used for indirect distillation, whereby the higher halide (MbX$_f$) is converted by the reaction into the lower halide (MbX$_g$) of the same element (Mb) with the formation of a halide (MeX$_n$) of the metal (Me) to be recovered, and show that the aforementioned conditions 1 (a) and (b) are quite generally applicable. If the element (Mb) combined with the halogen in the reacting higher halide (MbX$_f$) is, however, a non-volatile element, it is a further condition for the choice of the higher halide (MbX$_f$) that the reaction between the lower halide (MbX$_g$) and the metal (Me) to be recovered be so strongly endothermic that reduction of the lower halide (MbX$_g$) to the element (Mb), with formation of the halide (MeX$_m$) of the non-volatile metal (Me), does not (or does not appreciably) take place under the conditions of the reaction with the metal bearing material.

The best conditions for choosing the reacting halide and for carrying out the indirect distillation according to the present invention can be found from the folowing equilibrium considerations which, for the sake of simplification, have again been formulated for the halide of a volatile element as halide of a volatile substance.

By passing the vapour of the halide of a volatile element over the metal bearing material, equilibrium between the vapours of the volatile element, its halide, and the stable halide of the non-volatile metal, will be substantially established according to reaction (I), and the equilibrium constant is given by $$K = \frac{p(Ma)^n p(MeX_n)^m}{p(MaX_m)^n}$$

where K denotes the equilibrium constant, which depends on the nature of the metal bearing material and the temperature, and $p(Ma)$, $p(MaX_m)$ and $p(MeX_n)$ denote the partial pressure of the vapours of the volatile element (Ma), its halide (MaX$_m$) and the halide (MeX$_n$) of the non-volatile metal respectively. For instance, for beryllium distilled in an atmosphere of sodium chloride this equation is $$K = \frac{p(Na)^2 \cdot p(BeCl_2)}{p(NaCl)^2}$$

If $p_0$ denotes the pressure with which the halide of the volatile element enters the reaction chamber (initial pressure) and $\alpha$ denotes the fraction of this halide actually converted into the halide of the normally non-volatile metal to be distilled, thus measuring the efficiency of the reaction, the equation for the equilibrium constant can be written as $$K = \frac{p_0^m \alpha^{(n+m)}}{(1-\alpha)^n} \cdot \left(\frac{m}{n}\right)^m$$

for instance, in the case of the example, $$K = \frac{p_0(NaCl)\alpha^3}{2(1-\alpha)^2}$$

This equation shows that the reaction will be the more complete the lower the initial pressure, or the initial partial pressure, of the higher halide. However, the pressure should not be too low, because the actual amount distilled per unit of time and per unit of surface area of the metal bearing material would then be too low. Pressures of about .05 mm. mercury appear to be the limit on a somewhat larger scale of production, this limit being dependent on, and decreasing with, decreasing scale.

The chemical reaction (I) according to the invention is endothermic and will therefore go the nearer to completion the higher the temperature as long as dissociation of the stable halide into a lower unstable halide does not occur.

In general, however, it is most economic to be content with an efficiency of between 30–90 per cent. as expressed in $\alpha$; if one aims at a higher efficiency than $\alpha=0.9$ a relatively high rise in temperature is necessary for a relatively small change in $\alpha$. Furthermore, the reaction of indirect distillation according to the invention is less endothermic than direct evaporation, and the vapour pressure of the non-volatile metal increases therefore more steeply with increasing temperature than the apparent vapour pressure brought about by the method according to the invention. Since the ratio between apparent vapour pressure due to indirect distillation and the actual vapour pressure of a normally non-volatile metal decreases with increasing temperature, the relative efficiency of the method according to the invention decreases with rising temperature.

A suitable reacting halide, and appropriate temperature and pressure for carrying out the indirect distillation of a non-volatile metal, can be found by evaluating the equilibrium constant K of the distillation reaction, according to the invention, and its dependence on temperature. The equilibrium constant K is given by $$\log K = -\frac{h'}{4.574T} + \frac{S'i}{4.574}$$

in which equation h' and S'i denote the heat, and entropy of reaction at inert pressure and at the temperature T respectively. The heat of reaction can be calculated from the heat of formation of the halides participating in the reaction and from the heats of evaporation of the gaseous reactants, in a well established manner. These values are well known for a great number of halides and can, in the few cases where figures are not available in the literature, be estimated by the rules of analogy and interpolation. The heats of evaporation of all the more common volatile metals are also well known.

The standard entropy of reaction at reaction temperature S'i can also be calculated from the standard entropies of the reactants at reaction temperature. The standard entropies are either known through direct measurements (as for most of the metals), or can be calculated exactly (as for nearly all the metal vapours and many halide vapours), or they can be estimated accurately enough by well known rules.

The alteration of the entropy term brought about by substituting the reaction of indirect distillation according to the invention for the direct evaporation can have the effect of either raising or lowering the distillation temperature, but is usually of very little influence; in most cases it acts towards a further reduction in distillation temperature. The effect, however, is usually small, especially for the heavier metals.

Thermodynamic magnitudes relating to room temperature have to be corrected to reaction temperature by the relevant laws and rules.

For instance, using the thermochemical values as before and values for the molar heats (in cals) of $4.698+1.55.10^{-3}T-1.210.10^5T^{-2}$ for beryllium, 9 for sodium chloride gas, 14 for beryllium chloride gas and 5 for sodium gas, the reaction heat h in the reaction of sodium chloride and beryllium to give beryllium chloride and sodium vapour is 53700 cals. at 1150° C.

The entropy of beryllium at 25° C. is 2.28. The entropies of sodium vapour and sodium chloride vapour can be calculated from molecular constants, the values at 25° C., being $S_{Na}=36.72$ and $S_{NaCl}=55.5$. The entropy of beryllium chloride vapour at 25° C. has been interpolated from the known entropies of similar molecules of the formula $AX_2$, the value adopted being 60. With these values and the molar heats as before, the entropy of the reaction at 1150° C. can be calculated and amounts to 21. The equilibrium constant at 1150° C. therefore becomes:

$$\log K_{p_{atom}} = -\frac{11740}{T} + 4.59$$

or $$\log \frac{\alpha^3 p^2 mm.}{2(1-\alpha)^2} = -\frac{11740}{T} + 7.47 = -8.25 + 7.47 = -0.77$$

According to this equation, sodium chloride at about 1 mm. pressure, when brought into contact with beryllium at 1150° C. is to an appreciable extent converted into beryllium chloride, leading to the distillation of beryllium with an apparent pressure of about 0.25 mm., a very considerable increase over the saturation pressure of beryllium (0.0013 mm.). This increase in the rate of distillation has been verified experimentally, as shown in the example.

When practising the invention, the vapour of the halide of the volatile substance is brought into contact at elevated temperature with the metal bearing material, which for that purpose is brought into a condition in which it offers a high specific surface area to the halide vapour. If it is solid at the reaction temperature, it is preferably used in the form of a coarse powder, loose, or in the form of porous briquettes; if liquid, it is sprayed as a film or in the form of drops over a non-reacting material of a high specific surface area, or it may be dispersed as a shower or a spray within the reacting halide vapour or its mixture with an inert gas. The reacting halide vapour may be introduced into the reacting chamber as such, preferably under reduced pressure, or contained in some indifferent carrier gas under reduced, atmospheric, or elevated pressure. The halide vapour may also be generated in the reaction chamber by introducing into the chamber and placing in a position of appropriate temperature the solid or liquid halide or another substance from which the vapour of the halide of a volatile substance is evolved on heating.

Of the halides, fluorides and chlorides are preferred, although bromides, and in some cases also iodides, may be used. The characteristic difference in the heats of dissociation may be greatest with the fluorides, which is advantageous, but fluorides have often very low vapour pressures compared with the corresponding chlorides, which is then a disadvantage in their use. The characteristic heat differences are usually smaller with bromides than with chlorides and are even smaller with iodides, which latter have often the disadvantage of appreciable dissociation into iodine atoms.

Depending on the nature of the halide used and the metal bearing material and the procedure of distillation, the halide of the volatile substance condenses either entirely separated from the metal or, to a varying degree, together with it. The necessary condition for separate condensation is that the vapour brought into contact with the metal bearing material be in an unsaturated state, i. e. of a pressure or partial pressure lower than the vapour pressure of the halide at the temperature of contact. This can be achieved, for instance, by keeping the pressure in the system practically constant and the reaction temperature above the temperature of evaporation of the halide, or by allowing for expansion or dilution of the halide vapour from the place of evaporation to the place of reaction at practically constant temperature, or by combining these two measures. If the partial pressure of the halide of the volatile substance under the appropriate conditions of reaction is small in comparison with its vapour pressure at reaction temperature (highly unsaturated vapour), the normally non-volatile metal condenses at much higher temperature than the halide, and therefore entirely separated from it. It is thus highly advantageous to use such halides for reaction which, under the pressure existing in the system, sublime or boil at temperatures far below reaction temperature (low boiling or subliming halide). In this case the halide is, after reaction, either condensed at much lower temperatures than the normally non-volatile metal, or even recirculated into the reaction system without condensation at all, by keeping the metal condenser and all other parts of the system, including the pumping arrangements necessary for the circulation, above the condensation temperature of the halide of the volatile substance. If the halide is condensed, preferably at least two halide condensers are employed and utilised alternately as halide condenser and halide evaporator, whereby the same amount of halide is repeatedly used for reaction with the metal bearing material, essentially without discontinuing the distillation.

If, on the other hand, the vapour pressure of the reacting halide at reaction temperature is comparable with, though greater than, its pressure when entering into reaction, i. e. if the unsaturated vapour is nearer to saturation, the metal condenses partly together with the halide of the volatile substance and has to be separated from it by mechanical or other means—for instance, melting and segregating or using a solvent for the halide, followed by filtration of the solution. It is therefore most advantageous to choose the reacting halide, its pressure, and the reaction conditions so that the temperature of condensation of the halide is low in comparison with the temperature of effective reaction, even if the use of such halides entails use of a somewhat higher reaction temperature compared with other halides with which the difference between reaction and halide condensation temperature is less. If the condensed halide of the volatile substance contains only relatively little distilled metal it can be re-used without further separation, without danger of reducing the subsequent yield or yields appreciably. If the saturated vapour of the halide is used the metal and halide condense in essentially overlapping zones.

In order to separate the normally non-volatile metal (Me) from a material bearing several such metals it may be necessary first to choose a halide of a volatile substance and the conditions of reaction in such a manner that by distilling a group of at least two non-volatile metals from material bearing the same one group of metals (residue) is first separated from another group of metals (distillate) of which substantially only one contains the metal (Me) to be recovered, and to recover the pure metal (Me) afterwards, for instance by using another reacting halide to distill either the metal (Me) off the residue or to obtain it substantially pure by distilling all the other constituents off the distillate, according to whether the original residue or distillate contained the metal (Me) to be recovered.

*Examples*

Impure beryllium and impure vanadium were subjected to the distillation according to the present invention, in each case using sodium chloride as the reacting halide.

These raw materials, in the form of a coarse powder, were heated inside a refractory tube which was open at both ends and fitted into a mullite tube. Sodium chloride contained in a boat was also placed inside the same mullite tube near its closed end. The other end of the tube, which was kept cold, was connected to the evacuation system.

Two-thirds of the length of the mullite tube adjacent to the closed end could be heated by two furnaces. These were so positioned that the sodium chloride boat and the impure metals could independently be brought to the desired temperatures, there being a smooth temperature gradient between the two furnaces. In each experiment the system was first evacuated until the pressure had dropped to less than 1/1000 mm. mercury; the metal bearing material was then brought to the desired temperature, and finally the sodium chloride was heated.

In experiments with impure vanadium containing impurities of aluminium, iron, silicon and copper, the sodium chloride was maintained at about 800° C. and the impure vanadium heated to a temperature estimated as round about 1400° C. Appreciable amounts of vanadium distilled, condensing partly alone, partly mixed with the salt. The composition of the distillate varied with the condensation temperature, but the distillate contained only traces of iron, silicon and copper, and at least part of it contained also remarkably little aluminium. In blank experiments with the same apparatus but without using the sodium chloride stream, only negligible traces of vanadium distilled.

In experiments with impure beryllium the sodium chloride was maintained around 800° C. and the impure beryllium at temperatures between 1050° C. and 1150° C. The distilled beryllium condensed partly separated from, partly together with, the sodium chloride, the ratio between beryllium and sodium chloride being substantially that predicted by the thermodynamical calculations.

I claim:

1. A process for the distillation of a normally non-volatile metal having a stable halide from materials bearing the same which comprises selecting a halide of a volatile substance the vapour of which has an average heat of dissociation into substance vapour and halogen atoms smaller than the average heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said halide, contacting and reacting the vapour of the said halide with the said material at an elevated temperature which under the prevailing pressure is above the temperature of evaporation of the said volatile substance in contact with the said metal bearing material and below the temperature of formation of any unstable lower halide of the said non-volatile metal from the said metal bearing material, thereby reacting the non-volatile metal with the vapour of the halide of the volatile substance to vaporize the stable halide of the non-volatile metal from said material with simultaneous formation of the vapour of the volatile substance, and cooling the vapour mixture from said reaction to convert said mixture into the non-volatile metal and the halide of the volatile substance and condense the non-volatile metal.

2. A process for the distillation of a normally non-volatile metal having a stable halide from materials bearing the same which comprises selecting a halide of a volatile element the vapour of which has an average heat of dissociation into its constituent atoms smaller than the heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said halide, contacting and reacting the said halide vapour with the said material at an elevated temperature which under the prevailing pressure is above the temperature of evaporation of the said volatile element in contact with the said metal bearing material and below the temperature of formation of any unstable lower halide of the said non-volatile metal from the said metal bearing material, thereby reacting the non-volatile metal with the vapour of the halide of the volatile element to vaporize the stable halide of the non-volatile metal from said material with simultaneous formation of the vapour of the volatile element, and cooling the vapour mixture from said reaction to convert said mixture into the non-volatile metal and the halide of the volatile element and condense the non-volatile metal.

3. A process for the distillation of a normally non-volatile metal having a stable halide from materials bearing the same which comprises selecting a higher halide of an element the vapour of which has an average heat of dissociation into the lower halide of the element and halogen atoms smaller than the average heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said higher halide, contacting and reacting the vapour of the said higher halide with the said material at an elevated temperature which under the prevailing pressure is above the temperature of formation of the lower halide of the said element and below the temperature of formation of any unstable lower halide of the said non-volatile metal from the said metal bearing material, thereby reacting the non-volatile metal with the vapour of the said higher halide to vaporize the stable halide of a non-volatile metal from said material with simultaneous formation of the vapour of the lower halide of the said element, and cooling the vapour mixture from said reaction to convert said mixture into the non-volatile metal and the higher halide of the element and condense the non-volatile metal.

4. A process for the distillation of a normally non-volatile metal having a stable halide from materials bearing the same which comprises selecting a halide of a volatile metal the vapour of which has an average heat of dissociation into its constituent atoms smaller than the heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said halide, contacting and reacting the said halide vapour with the said material at an eleveated temperature which under the prevailing pressure is above the temperature of evaporation of the volatile metal and below the temperature of formation of any unstable lower halide of the said non-volatile metal from the said metal bearing material, thereby reacting the non-volatile metal with the vapour of the halide of the volatile metal to vaporize the stable halide of the non-volatile metal from said material with simultaneous formation of the vapour of the volatile metal, and cooling the vapour mixture from said reaction to convert said mixture into the non-volatile metal and the halide of the volatile metal and condense the non-volatile metal.

5. A process for the distillation of a normally non-volatile metal having a stable halide from materials bearing the same which comprises selecting a halide of a volatile substance the vapour of which has an average heat of dissociation into substance vapour and halogen atoms smaller than the average heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said halide, contacting and reacting the said halide vapour in a condition in which it is not saturated with respect to the said halide in condensed form with the said material at an elevated temperature which under the prevailing pressure is above the temperature of evaporation of the said volatile substance and below the temperature of formation of any unstable lower halide of the said non-volatile metal from the said metal bearing material, thereby reacting the non-volatile metal with the unsaturated vapour of the halide of the volatile substance to vaporize the stable halide of the non-volatile metal from said material with simultaneous formation of the vapour of the volatile substance, and cooling the vapour mixture from said reaction to convert said mixture into the non-volatile metal and the halide of the volatile substance and condense the non-volatile metal.

6. A process for the distillation of a normally non-volatile metal having a stable halide from materials bearing the same which comprises selecting a halide of a volatile substance the vapour of which has an average heat of dissociation into substance vapour and halogen atoms smaller than the average heat of dissociation of the vapour of the stable halide of the said non-volatile metal into halogen atoms and metal atoms and greater than the average heat of dissociation of the vapour of the stable halide of the said normally non-volatile metal into halogen atoms and condensed metal, evaporating the said halide, contacting and reacting the said halide vapour in a partial vacuum with the said material at an elevated temperature which in the said partial vacuum is above the temperature of evaporation of the said volatile substance and below the temperature of formation of any unstable lower halide of the said non-volatile metal from the said metal bearing material, thereby reacting the non-volatile metal with the vapour of the halide of the volatile substance to vaporize the stable halide of the non-volatile metal from said material with simultaneous formation of the vapour of the volatile substance, and cooling the vapour mixture from said reaction to convert said mixture into the non-volatile metal and the halide of the volatile substance and condense the non-volatile metal.

7. A process for the distillation of a group of at least two normally non-volatile metals having stable halides from material bearing the same which comprises selecting a halide of a volatile substance the vapour of which has an average heat of dissociation into substance vapour and halogen atoms smaller than the average heat of dissociation of the vapour of the stable halides of each of the said non-volatile metals of the group into halogen atoms and metal atoms and greater than the average heat of dissociation of the vapour of the stable halides of each of the said normally non-volatile metals of the group into halogen atoms and condensed metal, evaporating the said halide, contacting and reacting the said halide vapour with the said material at an elevated temperature which under the prevailing pressure is above the temperature of evaporation of the said volatile substance and below the temperature of formation of any unstable lower halides of the said non-volatile metals of the group thereby reacting the non-volatile metals with the vapour of the halide of the volatile substance to vaporize the stable halides of the said non-volatile metals from said material with simultaneous formation of the vapour of the volatile substance and cooling the vapour mixture from said reaction to convert said mixture into the non-volatile metal and the halide of the volatile substance and condense the non-volatile metals.

PHILIPP GROSS.

REFERENCES CITED

The following references are of record in the file of this patent:

UNITED STATES PATENTS

| Number | Name | Date |
|---|---|---|
| 2,184,705 | Willmore | Dec. 26, 1939 |
| 2,236,234 | Hanak | Mar. 25, 1941 |
| 2,470,305 | Gross | May 17, 1949 |
| 2,470,306 | Gross | May 17, 1949 |